(12) United States Patent
Sauer et al.

(10) Patent No.: US 8,330,723 B2
(45) Date of Patent: Dec. 11, 2012

(54) METHOD AND SYSTEM OF COUPLING AN OUTER COVERING TO A FRAME OF AN APPLIANCE

(75) Inventors: Keith A. Sauer, Spring, TX (US);
Jeffrey A. Lev, Tomball, TX (US);
Kenneth D. Reddix, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1022 days.

(21) Appl. No.: 12/342,713

(22) Filed: Dec. 23, 2008

(65) Prior Publication Data
US 2010/0156794 A1 Jun. 24, 2010

(51) Int. Cl.
*G06F 3/02* (2006.01)
(52) U.S. Cl. .............................. 345/168; 345/5
(58) Field of Classification Search ......................... None
See application file for complete search history.

(56) References Cited

U.S. PATENT DOCUMENTS
7,248,463 B2 * 7/2007 Bander et al. ............ 361/679.27
* cited by examiner

*Primary Examiner* — Muhammad N Edun

(57) ABSTRACT

Coupling an outer covering to a frame of an appliance. At least some of the illustrative embodiments are devices including a frame member of an appliance (the frame member defines an outer portion and a first ridge feature on the outer portion, the first ridge feature has a length along the frame member, a height, and a flat contact portion that defines a width), an outer covering member in contact with the contact portion of the first ridge feature, and an adhesive disposed between the frame member and the outer covering member proximate to the first ridge feature (the adhesive adhered to the frame member and the outer covering member). For at least a portion of the length of the first ridge feature, a thickness of the adhesive is the same as a height of the first ridge feature.

15 Claims, 3 Drawing Sheets

METHOD AND SYSTEM OF COUPLING AN OUTER COVERING TO A FRAME OF AN APPLIANCE

BACKGROUND

A growing trend in the computer industry is to have a metallic outer covering or skin on computer systems, particular portable computer systems such as laptops and/or notebooks. However, because of irregularities in thickness of the outer skin material and/or underlying frame material, and also because of warping of the various components, ensuring a proper bond between the outer skin material and the underlying frame material is difficult. In particular, bond strength of adhesives used to bond the outer skin to the frame material is based on thickness of the adhesive material at activation. Because of the irregularities and warping of the components, controlling adhesive thickness is sometimes difficult.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to components by different names. This document does not intend to distinguish between components that differ in name but not function.

In the following discussion and in the claims, the terms "including" and "comprising" are used in an open-ended fashion, and thus should be interpreted to mean "including, but not limited to . . . " Also, the term "couple" or "couples" is intended to mean a direct or indirect connection. Thus, if a first device couples to a second device, that connection may be through a direct connection, or through an indirect connection via other devices and connections.

"Proximate" shall mean, in reference adhesive and a ridge feature, the closest edge of the adhesive to the ridge feature is within two centimeters of the ridge feature.

"Appliance" shall mean a device used in residential or commercial settings that is electrically operated (e.g., by power from a wall socket or battery), such as, but not limited to, desktop computers, server computers, laptop or notebook computers, portable electronic devices, refrigerators, microwaves, vending machines, water dispensers, washing machines, dryers, and toasters.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
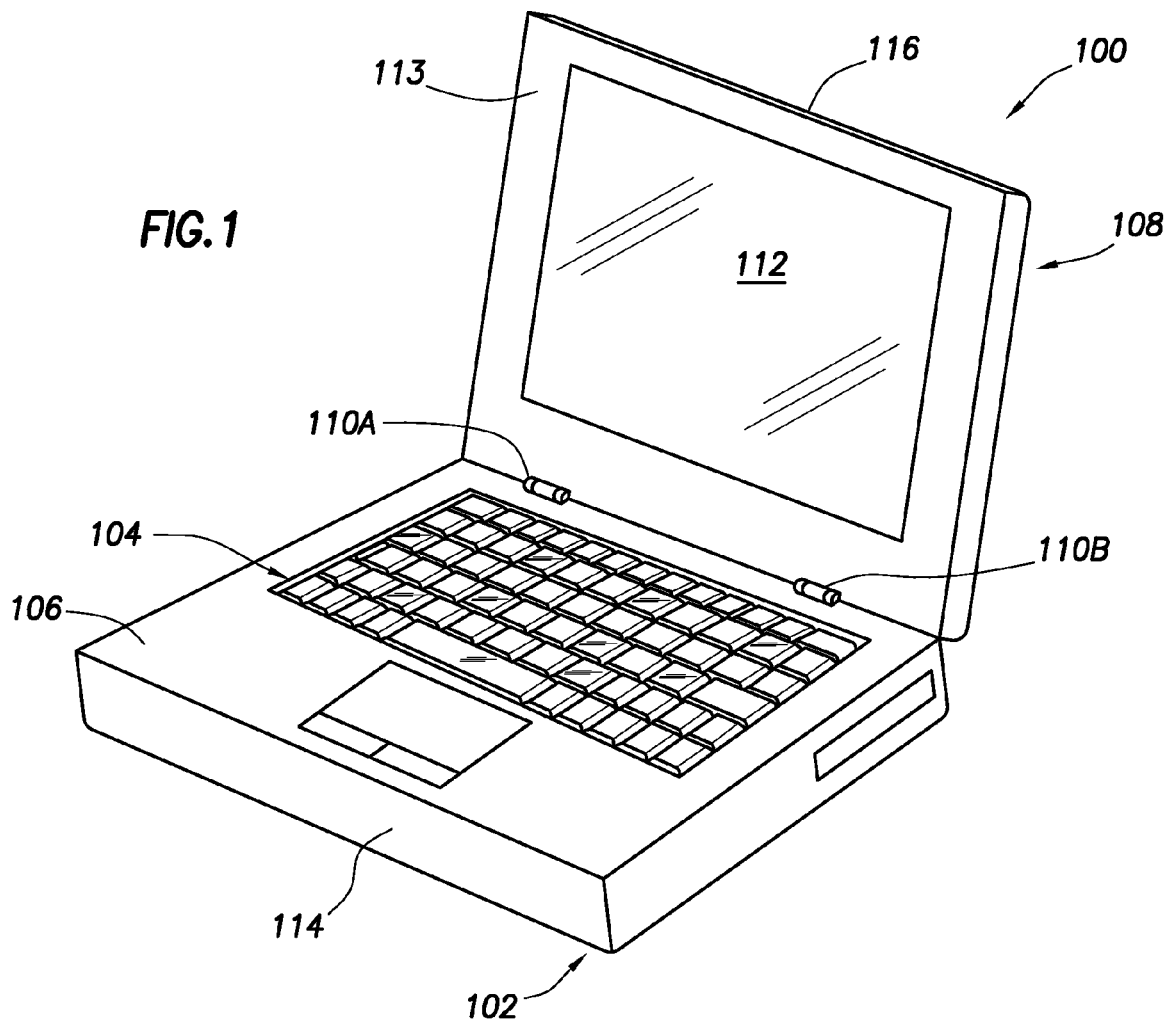
FIG. 1 shows a portable computer system in accordance with at least some embodiments.

FIG. 1 illustrates an appliance in accordance with at least some embodiments, the appliance in the form of a laptop or notebook computer 100. In particular, the notebook computer 100 comprises a base portion 102 with a keyboard 104 disposed on a surface 106 of the base portion 102. The notebook computer 100 also comprises a screen portion 108 hinged to the base portion 102, such as by hinges 110. The screen portion 108 comprises a display screen 112 viewable on one surface 113 of the screen portion 108.

In accordance with at least some embodiments, the illustrative notebook computer 100 has an underlying frame portion and an outer covering portion. More particularly, the base portion 102 has a frame member (not visible in FIG. 1) upon which the outer covering member 114 is bonded, and to which other components (e.g., a motherboard, a disk drive) are coupled. Likewise, the screen portion 108 has a frame member (not visible in FIG. 1) upon which an outer covering member 116 is bonded, and to which other components (e.g., the display screen 112) are coupled. In order to describe the relationship between the frame and the outer covering, the specification turns to FIG. 2 which is illustratively directed to the screen portion 108. However, the various embodiments discussed with respect to FIG. 8 are equally applicable to the base portion 102.

Figure 2:
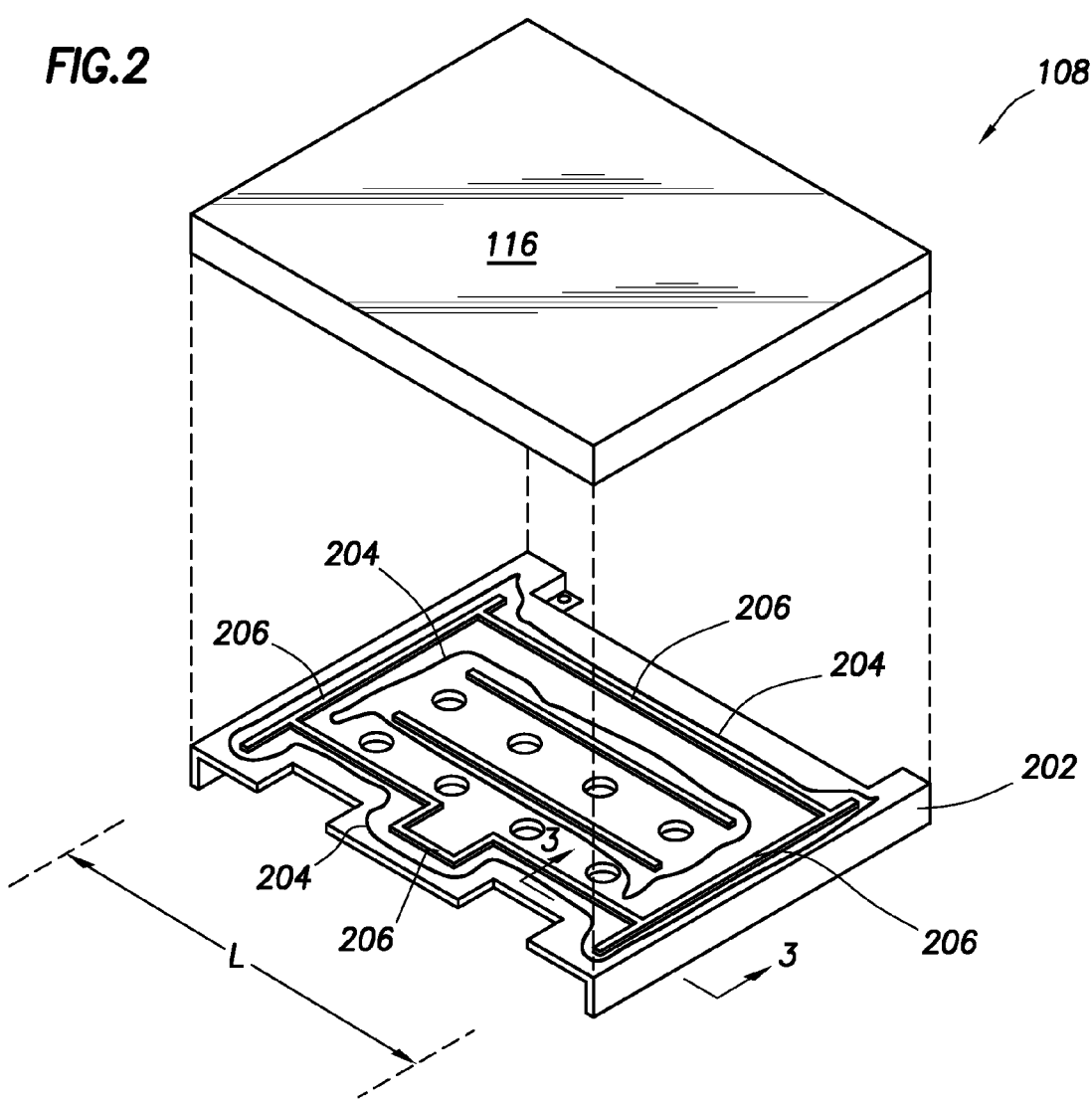
FIG. 2 shows an exploded view of the screen portion of a portable computer system in accordance with at least some embodiments.

FIG. 2 shows an exploded perspective view of the illustrative screen portion 108. In particular, the screen portion 108 comprises a skin or outer covering member 116 and the frame member 202. In accordance with at least some embodiments, frame member 202 is made of magnesium, or a magnesium alloy. In other embodiments the frame member 202 is made from any suitable material, such as plastic. The frame member 202 may be constructed in any suitable manner, including through injection molding techniques where molten magnesium is injected into a mold that defines that frame member 202 construction.

The outer covering member 116 telescopes over and is coupled to the frame member 202. In some embodiments, the outer covering member 116 is made of aluminum, or an alloy of aluminum. While a polished surface is possible for the outer covering member 116, in some embodiments the surface of the outer covering member 116 is a brushed aluminum. In yet other embodiments, the outer covering member 116 may be made of other metallic or plastic materials.

In accordance with the various embodiments, the outer covering member 116 is bonded to the frame member 202, such as by an adhesive 204. For example, the outer covering member 116 may be bonded to the frame member 202 by an acrylic adhesive, such as Scotch-Weld™ DP 810 NS available from 3M of St. Paul, Minn. In the illustrative case of DP 810 NS adhesive, the adhesive is activated by a combination of heat (e.g., on the order of 120 degrees C.) and pressure (e.g., on the order of 0.36 Mega Pascals). In other embodiments, an adhesive may be activated by pressure alone, and in yet still other embodiments an adhesive may be activated by time (i.e., the adhesive sets a certain amount of time after the components are combined).

In the illustrative embodiments of FIG. 2, the adhesive 204 is shown to be applied as a strip of adhesive to the frame member 202, such as in the form of a high viscosity liquid (i.e., gel). However, in other embodiments other forms of the adhesive (e.g., adhesive tape) may be equivalently used. Moreover, FIG. 2 illustrates embodiments where the adhesive is applied first to the frame member 202; however, in other embodiments the adhesive 204 may be applied first to the outer covering member 116.

With some adhesives, particularly adhesive activated by pressure and heat, the thickness of the adhesive during the activation process is related to the strength of the bond. If the adhesive is too thin, then bond strength is low. Likewise if the adhesive is too thick, particularly if the thickness is at the cost of contact area between the adhesive and the component, then bond strength is low. The related art attempts to control adhesive thickness during the activation process by use of automated systems that bring the components in close proximity, but which automated systems avoid actual contact between the components at the sites where the adhesive is present. For example, in the illustrative case of a screen portion, the outer covering member is held by a fixture, and the frame member is held by a fixture. After application of the adhesive, the fixtures move the components together in an attempt to flatten the adhesive to a particular thickness, but the fixtures are controlled to avoid contact between the members proximate to the locations where the adhesive is present.

However, the illustrative aluminum outer covering member may have thickness irregularities (e.g., variations in thickness being within manufacturing tolerances). Likewise, the illustrative magnesium frame member may have thickness irregularities caused by the illustrative injection molding process. Moreover, even in the absence of thickness irregularities, the components may warp because of handling and/or their thickness to length/width ration. Thus, even a finely tuned automated apparatus for controlling proximity of the components during the activation process may nonetheless be unable to ensure desired thickness of the adhesive during activation.

Still referring to FIG. 2, in accordance with the various embodiments the thickness of the adhesive during activation is controlled by a rib or ridge feature 206. The adhesive 204 is applied such that adhesive is proximate to a ridge feature 206 during activation. In the illustrative embodiments of FIG. 2, the ridge feature 204 is shown on the frame member 202; however, in other embodiments the ridge feature may be formed on the outer covering member 116. Moreover, in other embodiments the adhesive need not be initially applied to the same member as implements the ridge feature, so long as the adhesive 204 is proximate to the ridge feature 206 when the components are brought together. As illustrated in FIG. 2, ridge feature 206 has a length "L", which in some cases spans at least half the long dimension or width of the frame member 202.

Figure 3:
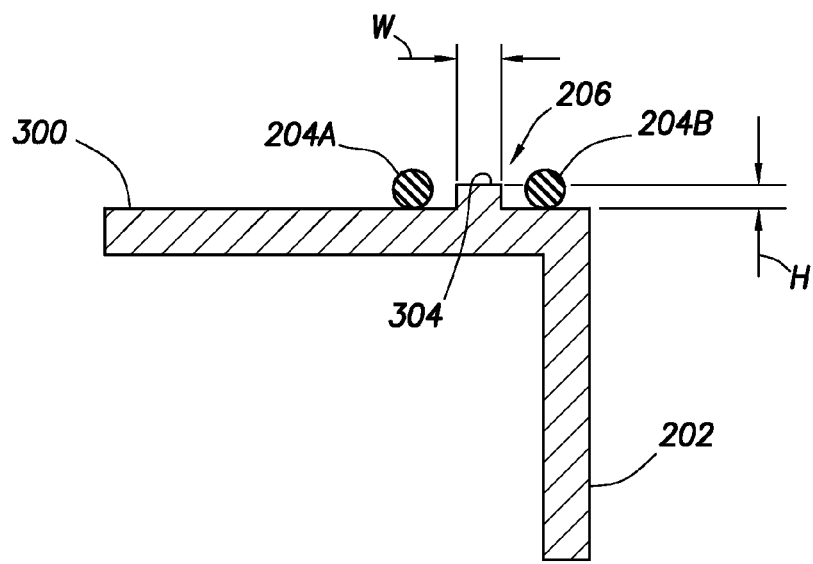
FIG. 3, taken along line 3-3 of FIG. 2, shows a cross-sectional view of a portion of the frame member in accordance with at least some embodiments.

FIG. 3, taken substantially along line 3-3 of FIG. 2, shows a cross-sectional view of the frame member 202 with applied adhesive 204. In particular, a portion of the frame member 202 is shown. On the outer surface 300 FIG. 3 illustrates a cross-sectional view of the adhesive 204 after application, but before the adhesive contacts the outer covering member 116 and is flattened. FIG. 3 also shows a cross-sectional view of an illustrative ridge feature 206. In particular, ridge feature 206 has a height "H" from measured from the outer surface 300.

Further, the ridge feature 206 defines a contact portion 304, which, as is discussed more below, contacts the outer covering member 116 during activation of the adhesive. The contact portion 304 likewise has a width "W". In some embodiments, the ridge feature 206 is integral with the frame member 202, such as being created during the injection molding process to create the frame member 202. In other embodiments, the ridge member is applied after creation of the frame member 202, such as by fasteners or mechanical clips. In embodiments where the ridge feature 206 is applied after creation of the frame member 202, the ridge feature need not be made of the same material as the frame member 202.

In accordance with the various embodiments, the ridge feature 206 being proximate to the adhesive ensures proper separation between the components during activation of the adhesive. In particular, the height H of the ridge feature 206 is selected to be the same as the desired thickness of the adhesive during activation. In the illustrative case of the ridge feature 206 on the frame member 202 of screen portion 108 of a notebook computer, the outer covering member 116 is brought into mating relationship with the frame member 202, and the outer covering member 116 abuts or contacts the contact portion 304 of the ridge feature 206. However, the height H of the ridge feature 206 prevents the outer covering member 116 from getting any closer to the frame member 202, thus ensuring the desired thickness of the adhesive during activation.

Figure 4:
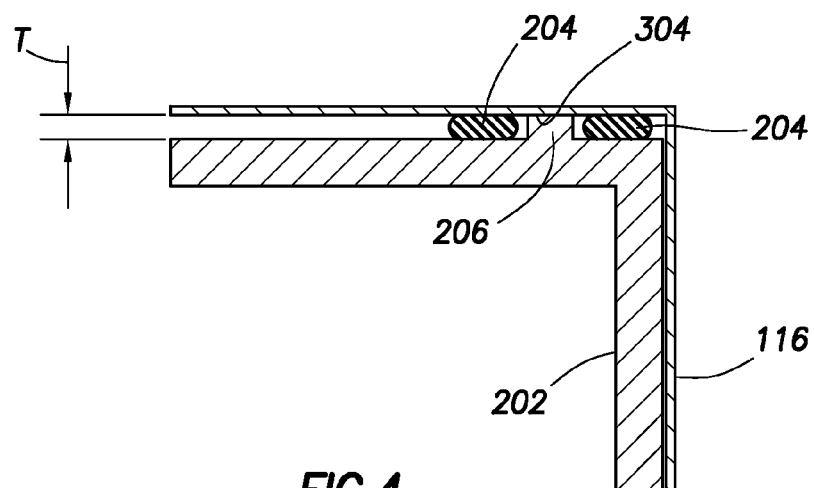
FIG. 4 shows a portion of the outer covering member and a portion of the frame member in mating relationship in accordance with at least some embodiments.

FIG. 4 shows a cross-sectional view of a portion of the frame member 202 and outer covering member 116 during activation. Inasmuch as the adhesive 204 substantially fixes the relation between illustrative frame member 202 and outer covering member 116, FIG. 4 also illustrates the relationship of the components after activation of the adhesive. In particular, FIG. 4 illustrates that the outer covering member 116 is brought into mating relationship with the frame member 202. The outer covering member 116 abuts the contact portion 304 of the ridge feature 206. At least in the vicinity of the ridge feature 206, the ridge feature 206 prevents the outer covering 116 from getting any closer to the frame member 202 than the height H. Thus, the thickness "T" of the adhesive during activation is substantially the same as the height H of the ridge feature 206.

In accordance with at least some embodiments, the width W of the contact portion 304 is based on the thickness of the outer covering member 116. For example, in the illustrative case of an outer covering member 116 being aluminum and having a thickness of 0.5 milli-meters (mm), the contact portion 204 of the ridge feature has a width W of about 3 mm to prevent the locations of the ridge features from being visible on the outer surface of the covering member 116. Stated in more generic terms, in the illustrative case of an aluminum outer covering member 116 having a thickness of 0.5 mm, the width W of the contact portion should be equal to or greater than about five times the thickness of the aluminum. If the thickness of the illustrative aluminum outer covering 116 is thinner than 0.5 mm, the width W of the contact portion 304 should be greater as compared to situations where the thickness of the illustrative aluminum outer covering 116 is between 0.5 mm and 1.0 mm. For aluminum outer covering members 116 having thickness equal to or greater than 1.0 mm, the width of the contact portion 304 is immaterial as the pressure used to activate the adhesive will not cause deflection of the aluminum at the contact point 304. Thus, in such illustrative situations the ridge feature 204 may have a triangular cross section (width W approaches zero). Furthermore, with different types of outer covering member 116 materials, different contact portion 304 widths may be used.

Continuing the specific example of an aluminum outer covering member 116 and magnesium frame member 202, when using the illustrative DP 810 NS adhesive, the ridge feature has a height H of about 0.1 mm, and the bead or strip of adhesive is initially placed 2 to 3 mm from the ridge feature. With the illustrative spacing and a particular bead size for the adhesive, when the adhesive is flattened as the components are brought into mating relationship the adhesive does not contact the ridge feature 206. As the cross-sectional area of the strip of adhesive changes (e.g., based on adhesive type, and desired bond strength), the placement of the adhesive may be adjusted. Furthermore, different adhesives may utilize different thicknesses to achieve best bond strength, and thus the height H of the ridge feature 206 may be adjusted according to the adhesive used.

Figure 5:
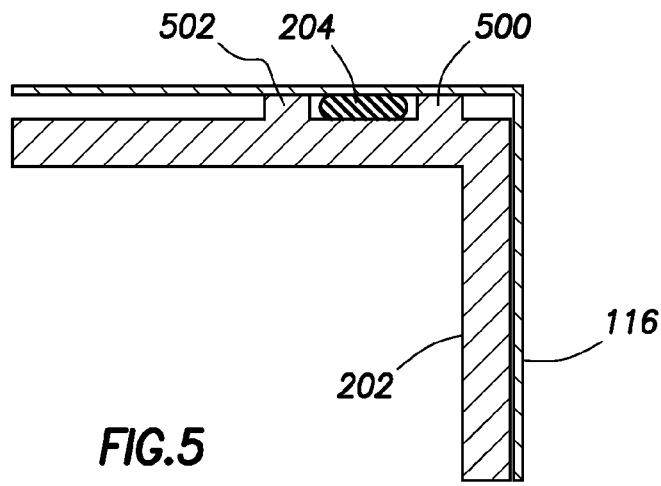
FIG. 5 shows a portion of the outer covering member and a portion of the frame member in mating relationship in accordance with other embodiments.

The various embodiments discussed to this point describe the adhesive as being proximate to only a single ridge feature. However, some outer covering members 116 may be too thin to ensure desired adhesive thickness when a single ridge feature is used. FIG. 5 illustrates a cross-sectional view of a portion of the frame member 202 and outer covering member 116 in alternative embodiments. In particular, in alternative embodiments the adhesive is bounded by ridge features 500 and 502 on each side of the adhesive 204. Thus, if a single ridge feature 500 is inadequate to ensure desired thickness of the adhesive during activation (e.g., because deflection of the outer covering member), the second ridge feature 502 may be used. In yet sill other embodiments, having a dual ridge features 500 and 502 may enable selection of an outer covering member 116 material and/or thickness not otherwise viable with a when the adhesive is proximate to a single ridge feature 206.

Figure 6:
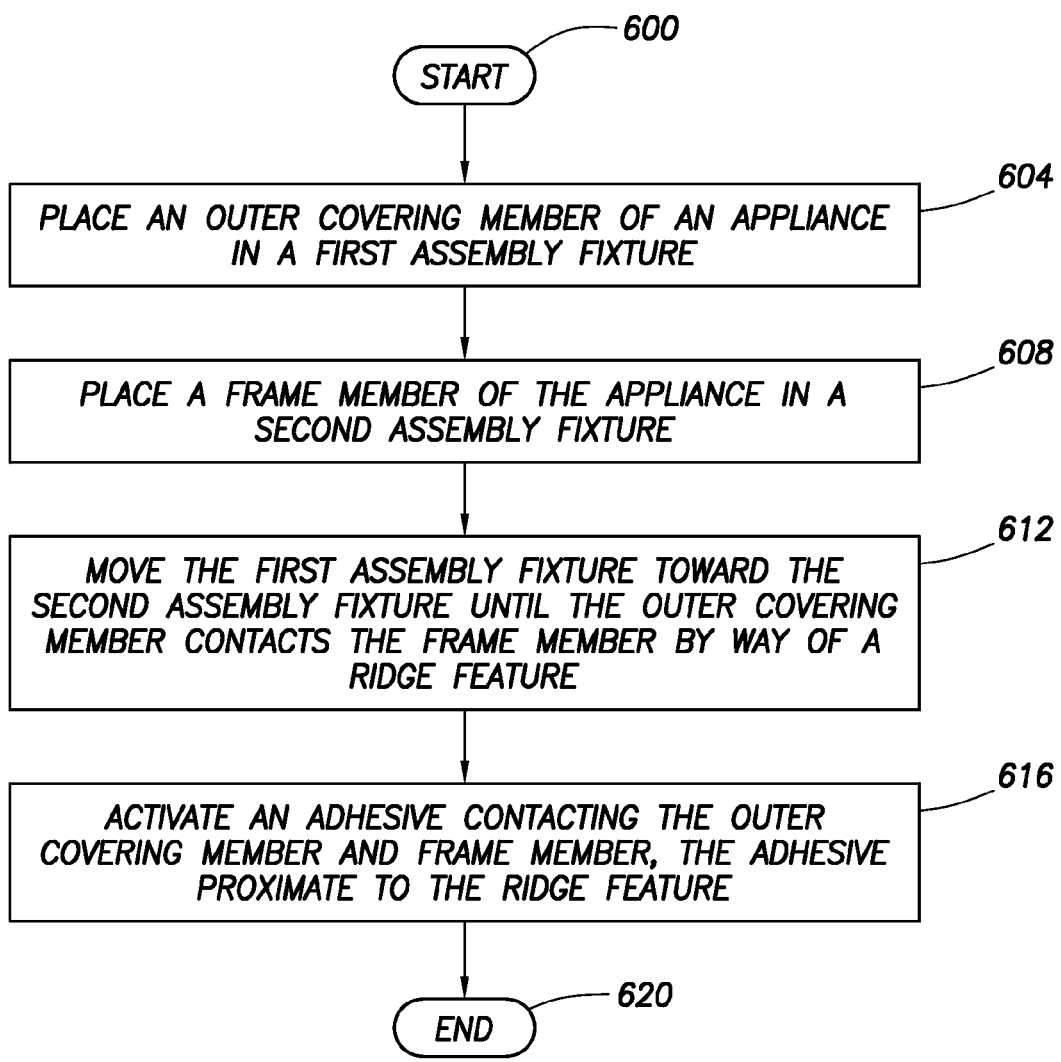
FIG. 6 shows a method in accordance with at least some embodiments.

FIG. 6 illustrates a method in accordance with at least some embodiments. In particular, the method starts (block 600) and proceeds to placing an outer covering member of an appliance in a first assembly fixture (block 604). Next, a frame member of the appliance is placed in a second assembly fixture (block 608). The first assembly fixture is moved toward to the second assembly fixture until the outer covering member contacts the frame member by way of a ridge feature (block 612). Thereafter, an adhesive contacting the outer covering member and the frame member is activated (block 616), and the illustrative method ends (block 620).

The above discussion is meant to be illustrative of the principles and various embodiments of the present invention. Numerous variations and modifications will become apparent to those skilled in the art once the above disclosure is fully appreciated. For example, the width W of the contact portion 304 of the ridge feature 206 is relatively narrow in relation to either the long or short dimension of the frame member 202. Such a configuration is desirable to reduce the weight of the frame member 202; however, when weight and/or the amount of material of the frame portion is not of concern, the width W of the contact portion may be significantly larger, such as greater than half the distance of the long or short dimension of the frame member 202. It is intended that the following claims be interpreted to embrace all such variations and modifications.

What is claimed is:

1. A device comprising:
    a frame member of an appliance, the frame member defines an outer portion and a first ridge feature on the outer portion, the first ridge feature has a length along the frame member, a height, and a flat contact portion that defines a width;
    an outer covering member in contact with the contact portion of the first ridge feature, the height of the first ridge prevents the outer covering member from coming into direct contact with the outer portion of the frame member; and
    an adhesive disposed between the frame member and the outer covering member proximate to the first ridge feature, the adhesive adhered to the frame member and the outer covering member;
    wherein, for at least a portion of the length of the first ridge feature, a thickness of the adhesive is the same as a height of the first ridge feature.

2. The device of claim 1 wherein the outer covering is aluminum.

3. The device of claim 1 wherein the frame portion is magnesium.

4. The device of claim 1 wherein the width of the contact portion of the first ridge feature is greater than or equal to five times the thickness of the outer covering.

5. The device of claim 1 wherein the frame portion defines a second ridge feature parallel to at least a portion of the first ridge feature, and wherein the adhesive is disposed between the first and second ridge feature.

6. The device of claim 1 wherein the adhesive is at least one selected from the group consisting of: activated by heat and pressure; activated by pressure; and activated by time.

7. The device of claim 1 wherein the length of the first ridge feature spans at least half a width of the frame member.

8. The device of claim 1 wherein the frame member is a frame of a portable computing device.

9. A computer system comprising:
    a base portion with a keyboard disposed on a surface of the base portion;
    a screen portion hinged to the base portion, a display screen viewable on one a surface of the screen portion, the screen portion further comprising:
        a screen frame member that defines an outer portion and a ridge feature disposed on the outer portion, the ridge feature defines an upper ridge portion;
        a first outer covering in contact with upper ridge portion, a height of the ridge feature prevents the first outer covering from direct contact with the outer portion of the screen frame member;
        an adhesive between the screen frame member and the first outer covering proximate to the ridge feature, the adhesive adhered to the screen frame member and the first outer covering;
        wherein, for at least a portion of a length of the ridge feature, a thickness of the adhesive is the same as the height of the ridge feature.

10. The computer system of claim 9 wherein the base portion further comprises:
    a base frame member that defines an outer portion and a ridge feature disposed on the outer portion, the ridge feature of the base frame member defines an upper ridge portion;
    a second outer covering in contact with upper ridge portion of the base frame member;
    an adhesive between the base frame member and the second outer covering proximate to the ridge feature of the base frame member;
    wherein, for at least a portion of a length of the ridge feature of the base frame member, a thickness of the adhesive between the base frame member and the second outer covering is the same as a height of the ridge feature of the base frame member.

11. The computer system of claim 9 wherein the screen frame is magnesium, and the first outer covering is aluminum.

12. A method comprising:
placing an outer covering member of an appliance in a first assembly fixture;
placing a frame member of the appliance in a second assembly fixture;
moving the first assembly fixture toward the second assembly fixture until the outer covering member contacts the frame member by way of a ridge feature a height of the ridge feature prevents the outer covering member from coming into direct contact with the frame member;
activating an adhesive contacting the outer covering member and frame member, the adhesive proximate to the ridge feature and separates the outer covering member and the frame member.

13. The method of claim 12 wherein, prior to contact of the outer covering with the frame member, applying the adhesive proximate to the ridge feature of the frame member.

14. The method of claim 12 wherein, prior to contact of the outer covering with the frame member, applying the adhesive proximate to the ridge feature of the outer covering.

15. The method of claim 12 wherein activating comprises at least one selected from the group consisting of: activating by heat and pressure; activating by pressure; and activating by time.

* * * * *

UNITED STATES PATENT AND TRADEMARK OFFICE
CERTIFICATE OF CORRECTION

| | | |
|---|---|---|
| PATENT NO. | : 8,330,723 B2 | Page 1 of 1 |
| APPLICATION NO. | : 12/342713 | |
| DATED | : December 11, 2012 | |
| INVENTOR(S) | : Keith A. Sauer et al. | |

It is certified that error appears in the above-identified patent and that said Letters Patent is hereby corrected as shown below:

In column 6, line 34, in Claim 9, delete "one a" and insert -- one --, therefor.

In column 7, line 8, in Claim 12, delete "feature" and insert -- feature, --, therefor.

Signed and Sealed this
Twelfth Day of March, 2013

Teresa Stanek Rea
*Acting Director of the United States Patent and Trademark Office*